May 15, 1951  V. NATALICCHIO  2,552,903
LIPSTICK CASE
Filed April 7, 1949
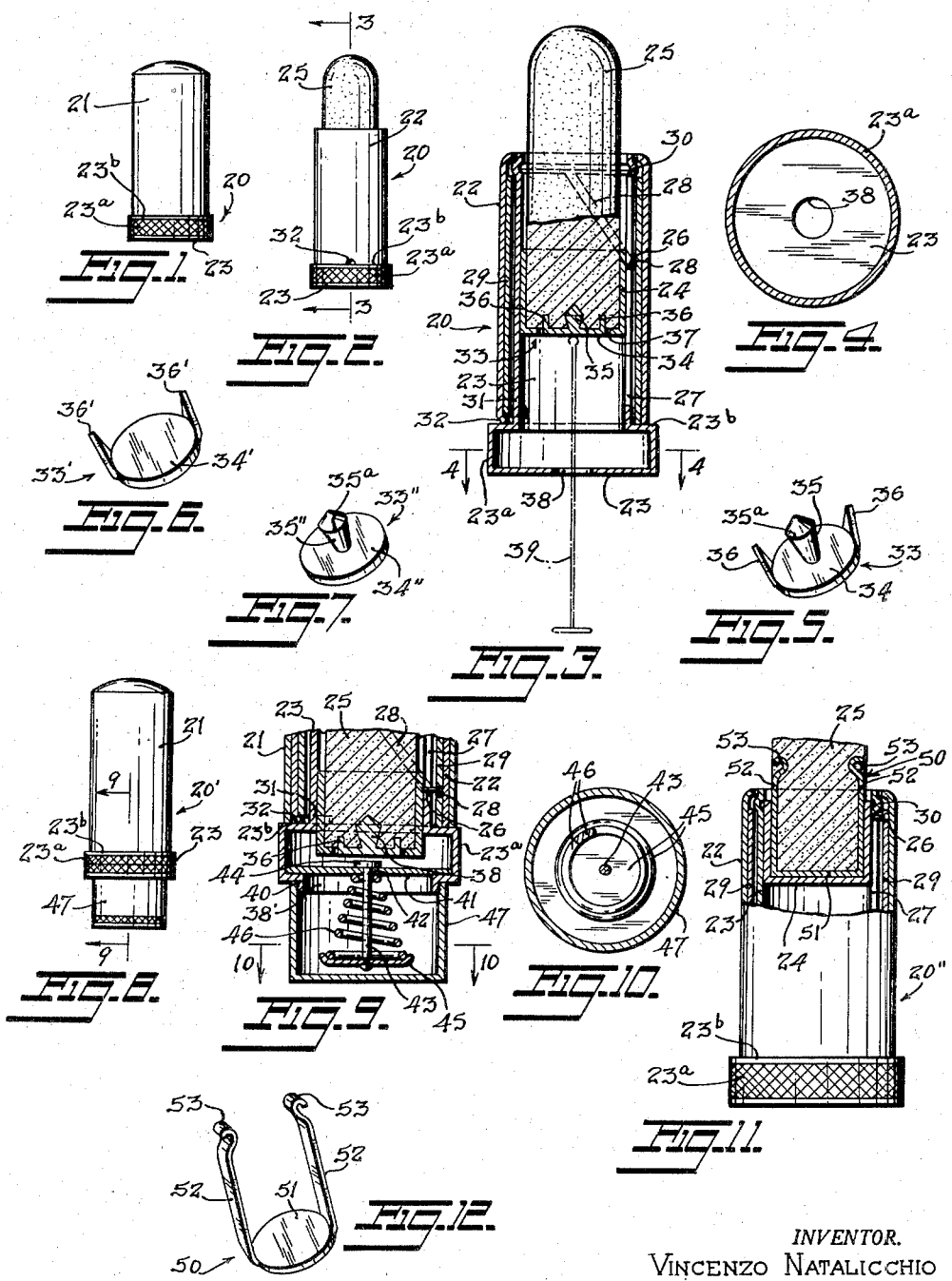
INVENTOR.
VINCENZO NATALICCHIO
BY
ATTORNEY Patented May 15, 1951

2,552,903

UNITED STATES PATENT OFFICE 2,552,903

LIPSTICK CASE

Vincenzo Nataliechio, Hoboken, N. J.

Application April 7, 1949, Serial No. 86,039

8 Claims. (Cl. 206—56)

This invention relates to new and useful improvements in a holder for lipstick or the like.

More particularly, the present invention relates to an improved holder for a lipstick or the like characterized by the provision of a means for ejecting the end of the stick member which usually remains in the holder so that it can be replaced with a fresh stick member enabling the one holder to be repeatedly used.

While the holder of the present invention is primarily designed for use with lipstick, it is equally well adapted for use as a holder for a styptic pencil or other similar toilet articles.

Another object proposes characterizing the holder by a tubular casing having an open end with a cup-shaped member into which the end of a lipstick is inserted and which end is provided with an ejector member molded into the material of the stick and upon which a means is to operate to cause the member with the remaining end of the lipstick to be ejected from the cup-shaped member.

A still further object of the present invention proposes exposing the ejector member within an opening formed in the bottom wall of the cup-shaped member in a manner so that said member can be engaged by said means for ejecting the same.

A further object of the present invention proposes forming the end of the casing with a hole aligned with the opening in the bottom wall of the cup-shaped member and through which the end of an ejector rod can be inserted for forcing the ejector member with the remains of the lipstick from the cup-shaped member.

The present invention further proposes providing the end of the casing, opposite its open end, with a slidably mounted ejector rod resiliently retained in an inoperative position and which has one end projected from the casing in a manner to be manually pressed inwards for ejecting the ejector member with the remaining end of the lipstick from the cup-shaped member.

Another object of the present invention proposes providing the closed end of the casing with a removable cap in a manner to enclose the projected end of the slidably mounted ejector rod when it is not being used for ejecting the ejector member with the remaining end of the lipstick.

Still further, the present invention proposes providing the ejector member with handle portions which extend along diametrically opposite sides of the lipstick and which are of a length to project from the open end of the casing when the cup-shaped member is moved completely toward the open end in a manner to be manually gripped for pulling the ejector member together with the remaining end of the stick member from the cup-shaped member.

It is a further object of the present invention to construct a holder for a lipstick or the like which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a holder for a lipstick or the like constructed in accordance with the present invention.

Fig. 2 is a view similar to Fig. 1, but with the cap removed and with the end of the stick member projected from the holder.

Fig. 3 is an enlarged longitudinal sectional view taken on the line 3—3 of Fig. 2.

Fig. 4 is a transverse sectional view taken on the line 4—4 of Fig. 3.

Fig. 5 is a perspective view of the ejector member used in the form of the invention shown in Figs. 1 to 4.

Fig. 6 is a perspective view of a modified form of ejector member which could be used in the form of the invention shown in Figs. 1 to 5.

Fig. 7 is a perspective view of a further modified form of ejector member which could be used in the form of the invention shown in Figs. 1 to 5.

Fig. 8 is a view similar to Fig. 1, but illustrating the holder constructed in accordance with a modification of the present invention.

Fig. 9 is a partial enlarged longitudinal sectional view taken on the line 9—9 of␣Fig. 8.

Fig. 10 is a transverse sectional view taken on the line 10—10 of Fig. 9.

Fig. 11 is an enlarged side elevational view of the lipstick holder constructed in accordance with a still further modification of the present invention and having the lipstick projected from the open end thereof and with a portion thereof broken away to reveal interior constructions.

Fig. 12 is a perspective view of the ejector member used in the form of the invention shown in Fig. 11.

The holder for lipstick or the like, according to the first form of the invention shown in Figs. 1 to 5, includes a casing 20 having an open end normally closed by a sleeve-like cap 21 which encloses the major portion of the length of the casing 20. The casing 20 is comprised of an outer tubular casing section 22 and an inner tubular casing section 23. At the open end of the casing 20, the sections 22 and 23 are even and the adjacent faces of the casing sections 22 and 23 are spaced from one another along the major portion of their length. The end of the inner casing section 23 opposite the open end of the casing 20 is projected beyond the adjacent end of the outer casing section 22 and is formed with an enlarged finger grip portion 23ª by which the inner casing section 23 can be rotated relative to the outer casing section 22 as is generally known in the art to which the present invention pertains. Between the portions of different diameter, the inner casing section 23 is formed with a shoulder 23ᵇ against which the adjacent end of the outer casing section 22 abuts as well as the end of the cap 21 when in position over the open end of the casing 20.

Slidably disposed within the inner casing section 23 there is a cup-shaped member 24 which is to be moved toward and away from the open end of the casing. One end of a stick member 25, which might be a lipstick, styptic pencil or other toilet article in stick form, is positioned within the cup-shaped member 24. Thus, when the cup-shaped member 24 is moved toward the open end of the casing the other end of the stick member 25 will be projected from the open end of the casing 20 for use.

Means is provided for advancing and retracting the cup-shaped member 24 and the stick member 25 carried thereby with relation to the open end of the casing 20. The advancing and retracting means is comprised of a pin 26 which projects radially from one side of the cup-shaped member 24. The free end of the pin projects through an elongated slot 27 formed longitudinally along one side of the inner casing section 23. The free end of the pin 26 engages a spiral groove 28 formed by bending a piece of metal 29 shaped like a parallelogram into a circle and positioning it within the outer casing section 22. The diameter into which the piece of metal 29 is bent, is somewhat larger than the inside diameter of the outer casing section 22 so that the piece of metal 29 frictionally engages the inside face of the outer casing section and is retained against rotation thereby. One end of the circular piece of metal 29 bears against the shoulder portion 23ᵇ and the other end engages an outwardly pressed circular rib 30 formed on the inner casing section 23 adjacent the open end of the casing 20. The end of the circular piece of metal 29 remote from the open end of the casing 20 is formed with a small cutout 31 and an aligned portion of the outer casing section 22 is formed with an inwardly pressed nipple 32, see Figs. 2 and 3, which serves to lock the parts together as an integral unit.

The constructions described to this point are conventional in the art to which the present invention relates and further details will not be given in this specification. It being deemed sufficient to say that when the finger grip portion 23ª of the inner casing section 23 is gripped and turned, the inner casing section will be rotated in one direction or the other relative to the outer casing section 22 and the piece of metal 29 causing the cup-shaped member 24 and the stick member 25 carried thereby to be extended or retracted with relation to the open end of the casing 20.

An ejector member 33 is provided in connection with the stick member 25 to facilitate the ejection of the remaining end of the stick member 25 from the cup-shaped member 24 so that it can be replaced by a fresh stick member. The ejector member 33 is characterized by a disc portion 34 which extends across the end of the stick member 25 within the cup-shaped member 24. Extending concentrically from the center of the disc portion 34 there is a central post 35 which is embedded in the end of the stick member 25. Formed on opposite sides of the central post 35 there are triangularly shaped lugs 36 which are also engaged into the end of the stick member 25. The central post 35 has an intermediate portion 35ª of a greater diameter than the remainder of the post which serves to securely anchor the ejector member 33 in position on the inserted end of the stick member 25.

The disc portion 34 of the ejector member 33, when the stick member 25 is in position in the cup-shaped member 24, is positioned within a complementary opening 37 formed in the bottom wall of the cup-shaped member 24 exposing the ejector member to the closed end of the casing 20. The wall of the finger grip portion 23ª of the inner casing 23 is formed with an aperture 38; see Figs. 3 and 4. An ejector rod 39, shown in dot and dash lines in Fig. 3, is to have one end passed through the aperture 38 to be engaged against the disc portion 34 of the ejector member 33 for forcing the remaining end of the stick member 25 from the cup-shaped member 24. Usually, the stick members 25 are used until their projected ends are worn away flush with the open end of the cup-shaped member 24. The ejector rod 39 need only be long enough to partially eject the remaining end of the stick member 25 from the cup-shaped member 24 when the cup-shaped member 24 is retracted completely into the casing 20. The cup-shaped member 24 with the partially extended stick member 25 can then be moved to the open end of the casing 20 so that the partially extended remaining end of the stick member 25 can be pulled from the cup-shaped member 24. On the other hand, the ejector rod 39 may be made long enough to completely eject the remaining end of the stick member 25 from the cup-shaped member 24 when the cup-shaped member is moved completely to the open end of the casing 20.

In the modification of the invention shown in Fig. 6, a slightly different form of the ejector member 33′ is illustrated. In this form of the invention, the ejector member 33′ has the disc portion 34′ from the opposite sides of which there extends the triangularly shaped lugs 36′.

The ejector member 33′ may be used interchangeably with the ejector member 33 illustrated in connection with the form of the invention shown in Figs. 1 to 5.

A still further modification of the ejector member 33″ is illustrated in Fig. 7 which is comprised of the disc portion 34″ from which the post 35″, having the intermediate portion 35ª of increased diameter, extends.

The ejector member 33″ may be used interchangeably with the ejector member 33 illustrated in connection with the form of the invention shown in Figs. 1 to 5 or interchangeably with the ejector member 33′.

The modification of the invention shown in Figs. 8 to 10 is similar to that described in connection with Figs. 1 to 5, differing only in that the ejector rod is a permanent attachment on the casing 20′.

In this modification of the invention, the finger grip portion 23ª of the inner casing 23 is formed with a rearwardly extending externally threaded flange 40 which surrounds the aperture 38′. A disc 41 is fixedly mounted across the aperture 38′ and formed with a hole 42 through which the end of the ejector rod 43 slidably extends. The end of the ejector rod 43 within the finger grip portion 23ᵃ is formed with an ejector head 44 and the outer end of the ejector rod is formed with a knob 45. An expansion spring 46 operates between the adjacent faces of the disc 41 and the knob 45 holding the ejector rod 43 in the inoperative position shown in Fig. 9, in which the head 44 of the ejector rod 43 is held against the inner face of the disc 41.

A cap 47 is engaged over the projected end of the ejector rod 39 and has threaded connection with the flange 40 so that the cap 47 can be removed to expose the ejector rod for use when desired. The threaded connection between the cap 47 and the flange 40 may be replaced by a pin and bayonet slot arrangement or any other connection which will removably retain the cap in its engaged position with the flange 40.

The operation of the form of the invention shown in Figs. 8 to 10 is as follows:

Normally, the assembled casing will appear as shown in Fig. 8. When the stick member 25 becomes worn away and it is desired to eject the same from the cup-shaped member 24, the cap 47 is first unscrewed from the flange 40 exposing the end of the ejector rod for use. With the cup-shaped member 24 completely retracted into the casing 20', the ejector rod 43 is pressed completely inward against the action of the spring 46 causing the remaining end of the stick member 25 to be partially ejected from the cup-shaped member 24. The ejector rod 39 is then released and the spring 46 will return it to its starting position. The cup-shaped member 24 is then advanced to the open end of the casing 20' so that the partially ejected remaining end portion of the stick member 25 will be extended from the open end of the casing to be gripped and completely pulled from the cup-shaped member 24. The fresh stick member 25 is then slipped into position in the cup-shaped member 24 and the device is ready for re-use.

In other respects this form of the invention is similar to the previous forms and like reference numerals identify like parts in each of the several views.

The form of the invention shown in Figs. 11 and 12 differs from the previous forms in the provision of an entirely different type of ejector member. The ejector member 50, of this modification of the invention, includes a disc portion 51 which extends along the end of the stick member 25 which is inserted into the cup-shaped member 24 of the casing 20''. Projecting from diametrically opposite sides of the disc portion 51 there is a pair of handle portions 52 which project longitudinally along the sides of the stick member 25. The free ends of the handle portions 52 are formed with curled finger grip portions 53.

The handle portions 52 are of a length so that when the cup-shaped member 24 is advanced to the open end of the casing 20'' the finger grip portions 53 will be extended beyond the open end of the casing, as shown in Fig. 11, to be manually gripped for pulling the remaining end of the stick member 25 together with the ejector member 50 from the cup-shaped member 24.

The end of the casing 20'' remote from its open end is not formed with an aperture 38 as in the case of the form of the invention shown in Figs. 1 to 5, but in other respects this form of the invention is similar to that shown in Figs. 1 to 5 and like reference numerals identify like parts in each of the several views.

While I have illustrated and described the preferred embodiments of my invention, it is to be understood that I do not limit myself to the precise constructions herein disclosed and the right is reversed to all changes and modifications coming within the scope of the invention as defined in the appended claims.

Having thus described my invention, what I claim as new, and desire to secure by United States Letters Patent is:

1. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejector member comprising a disc portion for extension across the inserted end of the stick member, a central post projecting from said disc portion and projected into the adjacent end of the stick member, and triangular lugs projecting from said disc portion on diametrically opposite sides of said disc portion and also projected into the adjacent end of the stick member.

2. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejector member comprising a disc portion for extension across the inserted end of the stick member, and a pair of triangular lugs projecting from said disc portion on diametrically opposite sides thereof and projected into the adjacent end of the stick member.

3. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said casing being formed at its closed end with an aperture aligned with said ejector member, said ejecting means comprising an ejector rod having one end extended through said aperture and engaging said ejector member for pressing said ejector member with the remaining end of the stick member from said cup-shaped member.

4. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejecting means comprising a disc mounted across an aperture formed in the closed end of said casing, said disc being formed with a hole, an ejector rod having one end slidably extended through said hole, an ejector head formed on the inner end of said ejector rod, a knob formed on the outer end of said ejector, and means retaining said ejector rod in a position extended from the closed end of said casing.

5. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejecting means comprising a disc mounted across an aperture formed in the closed end of said casing, said disc being formed with a hole, an ejector rod having one end slidably extended through said hole, an ejector head formed on the inner end of said ejector rod, a knob formed on the outer end of said ejector, and means retaining said ejector rod in a position extended from the closed end of said casing, said retaining means comprising an expansion spring on said ejector rod operating between the adjacent faces of said disc and said knob.

6. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejecting means comprising a disc mounted across an aperture formed in the closed end of said casing, said disc being formed with a hole, an ejector rod having one end slidably extended through said hole, an ejector head formed on the inner end of said ejector rod, a knob formed on the outer end of said ejector, and means retaining said ejector rod in a position extended from the closed end of said casing, and a cap enclosing the projected end of said ejector rod.

7. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejecting means comprising a disc mounted across an aperture formed in the closed end of said casing, said disc being formed with a hole, an ejector rod having one end slidably extended through said hole, an ejector head formed on the inner end of said ejector rod, a knob formed on the outer end of said ejector, and means retaining said ejector rod in a position extended from the closed end of said casing, and a cap enclosing the projected end of said ejector rod, and means for releasably securing said cap in position on the closed end of said tubular casing.

8. In a holder for lipstick or the like, a tubular casing having an open end and a closed end, a cup-shaped member slidably disposed within said casing for movement toward and away from the open end thereof for having one end of a stick member engaged therein so that the other end of the stick member will be projected from the open end of said casing when said cup-shaped member is moved toward the open end of said casing, an ejector member mounted on the end of the stick member which is engaged into said cup-shaped member, and means for ejecting said ejector member with the remains of said stick member from said cup-shaped member when said stick member is used up, said ejecting means comprising a disc mounted across an aperture formed in the closed end of said casing, said disc being formed with a hole, an ejector rod having one end slidably extended through said hole, an ejector head formed on the inner end of said ejector rod, a knob formed on the outer end of said ejector, and means retaining said ejector rod in a position extended from the closed end of said casing, and a cap enclosing the projected end of said ejector rod, and means for releasably securing said cap in position on the closed end of said tubular casing, said releasable securing means comprising a circular flange extending from the closed end of said tubular casing, said circular flange being externally threaded and said cap having threaded engagement with said flange.

VINCENZO NATALICCHIO.

REFERENCES CITED

The following references are of record in the file of this patent:

UNITED STATES PATENTS

| Number | Name | Date |
|---|---|---|
| 2,012,638 | Rodanet | Aug. 27, 1935 |
| 2,429,328 | Rault | Oct. 21, 1947 |

FOREIGN PATENTS

| Number | Country | Date |
|---|---|---|
| 544,419 | Germany | Feb. 18, 1932 |
| 634,375 | France | Nov. 18, 1927 |